(12) United States Patent
Ranganathan et al.

(10) Patent No.: US 12,455,701 B2
(45) Date of Patent: Oct. 28, 2025

(54) SCALABLE ACCESS CONTROL CHECKING FOR CROSS-ADDRESS-SPACE DATA MOVEMENT

(71) Applicant: Intel Corporation, Santa Clara, CA (US)

(72) Inventors: Narayan Ranganathan, Bangalore (IN); Philip R. Lantz, Cornelius, OR (US); Rajesh M. Sankaran, Portland, OR (US); Sanjay Kumar, Hillsboro, OR (US); Saurabh Gayen, Portland, OR (US); Nikhil Rao, Bengaluru (IN); Utkarsh Y. Kakaiya, Folsom, CA (US); Dhananjay A. Joshi, Portland, OR (US); David Jiang, Chandler, AZ (US); Ashok Raj, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 382 days.

(21) Appl. No.: 17/711,928

(22) Filed: Apr. 1, 2022

(65) Prior Publication Data

US 2023/0032586 A1 Feb. 2, 2023

Related U.S. Application Data

(60) Provisional application No. 63/226,159, filed on Jul. 27, 2021.

(51) Int. Cl.
*G06F 3/06* (2006.01)
*G06F 9/455* (2018.01)

(52) U.S. Cl.
CPC .......... *G06F 3/0655* (2013.01); *G06F 3/0604* (2013.01); *G06F 3/0679* (2013.01); *G06F 9/45558* (2013.01); *G06F 2009/45583* (2013.01)

(58) Field of Classification Search
CPC .... G06F 3/0655; G06F 3/0604; G06F 3/0679; G06F 9/45558; G06F 2009/45583; G06F 12/1441; G06F 12/1483; G06F 12/109
(Continued)

(56) References Cited

U.S. PATENT DOCUMENTS 5,848,006 A 12/1998 Nagata
7,191,341 B2 3/2007 Paaske et al.
(Continued)

FOREIGN PATENT DOCUMENTS

CN 108073423 5/2018
CN 113924557 1/2022
(Continued)

OTHER PUBLICATIONS

U.S. Appl. No. 17/478,828, filed Sep. 17, 2021, Anand K. Enamandram.
(Continued)

*Primary Examiner* — Hosain T Alam
*Assistant Examiner* — Subir Kumar Chowdhury
(74) *Attorney, Agent, or Firm* — NICHOLSON DE VOS WEBSTER & ELLIOTT LLP

(57) ABSTRACT

Methods and apparatus relating to scalable access control checking for cross-address-space data movement are described. In an embodiment, a memory stores an Inter-Domain Permissions Table (IDPT) having a plurality of entries. At least one entry of the IDPT provides a relationship between a target address space identifier and a plurality of requester address space identifiers. A hardware accelerator device allows access to a target address space, corresponding to the target address space identifier, by one or more of requesters, corresponding to the plurality of requester address space identifiers, respectively, based at
(Continued)

least in part on the relationship provided by the at least one entry of the IDPT. Other embodiments are also disclosed and claimed.

20 Claims, 10 Drawing Sheets

(58) Field of Classification Search
IPC .............. G06F 3/0655,3/0604, 3/0679, 9/4558, 9/45583, 12/1441, 12/1483, 12/109
See application file for complete search history.

(56) References Cited

U.S. PATENT DOCUMENTS

| | | | |
|---|---|---|---|
| 7,287,140 B1 * | 10/2007 | Asanovic | G06F 12/1483 711/208 |
| 8,494,155 B1 | 7/2013 | Poo et al. | |
| 8,516,269 B1 | 8/2013 | Hamlet et al. | |
| 8,694,778 B2 | 4/2014 | Teuwen et al. | |
| 8,819,685 B2 | 8/2014 | Zhang et al. | |
| 8,850,225 B2 | 9/2014 | Noehring et al. | |
| 8,954,788 B2 | 2/2015 | Abraham et al. | |
| 9,064,135 B1 | 6/2015 | Poo et al. | |
| 9,100,427 B2 | 8/2015 | Dubrovsky et al. | |
| 9,251,380 B1 | 2/2016 | Au et al. | |
| 9,584,329 B1 | 2/2017 | Trimberger | |
| 9,798,900 B2 | 10/2017 | Oh et al. | |
| 9,892,265 B1 | 2/2018 | Tripathy et al. | |
| 10,078,754 B1 | 9/2018 | Brandwine et al. | |
| 10,193,701 B2 | 1/2019 | Kim et al. | |
| 10,521,618 B1 | 12/2019 | Zhang et al. | |
| 10,742,421 B1 | 8/2020 | Wentz et al. | |
| 10,896,267 B2 | 1/2021 | Ndu et al. | |
| 10,999,263 B2 | 5/2021 | Mundra et al. | |
| 11,126,733 B2 | 9/2021 | Pappachan et al. | |
| 11,205,003 B2 | 12/2021 | Patel et al. | |
| 11,321,459 B2 | 5/2022 | Shen et al. | |
| 11,720,672 B2 | 8/2023 | Shen et al. | |
| 11,847,067 B2 | 12/2023 | Chhabra et al. | |
| 11,874,776 B2 | 1/2024 | Chhabra et al. | |
| 2002/0097724 A1 | 7/2002 | Halme et al. | |
| 2002/0129246 A1 | 9/2002 | Blumenau et al. | |
| 2002/0133762 A1 | 9/2002 | Susnow et al. | |
| 2004/0123121 A1 | 6/2004 | Paaske et al. | |
| 2004/0158711 A1 | 8/2004 | Zimmer | |
| 2005/0021986 A1 | 1/2005 | Graunke et al. | |
| 2005/0108532 A1 | 5/2005 | Bajikar | |
| 2005/0232415 A1 | 10/2005 | Little et al. | |
| 2006/0181942 A1 | 8/2006 | Cordero et al. | |
| 2006/0193470 A1 | 8/2006 | Williams et al. | |
| 2007/0180239 A1 | 8/2007 | Fujibayashi et al. | |
| 2008/0002590 A1 | 1/2008 | Thomas et al. | |
| 2008/0005706 A1 | 1/2008 | Sharma et al. | |
| 2008/0063197 A1 | 3/2008 | Jaquette et al. | |
| 2008/0065882 A1 | 3/2008 | Goodman et al. | |
| 2008/0222383 A1 | 9/2008 | Spracklen et al. | |
| 2010/0005375 A1 | 1/2010 | Dell et al. | |
| 2010/0023739 A1 | 1/2010 | Levit-Gurevich et al. | |
| 2010/0054466 A1 | 3/2010 | Kerins et al. | |
| 2011/0002461 A1 | 1/2011 | Erhart et al. | |
| 2011/0060915 A1 | 3/2011 | Tal | |
| 2011/0066837 A1 | 3/2011 | Lee et al. | |
| 2011/0149737 A1 | 6/2011 | Muthiah et al. | |
| 2011/0320921 A1 | 12/2011 | Gower et al. | |
| 2012/0008768 A1 | 1/2012 | Mundra et al. | |
| 2012/0030669 A1 | 2/2012 | Tsirkin | |
| 2012/0054455 A1 | 3/2012 | Wang et al. | |
| 2012/0072737 A1 | 3/2012 | Schrijen et al. | |
| 2012/0084674 A1 | 4/2012 | Visosky | |
| 2012/0137137 A1 | 5/2012 | Brickell et al. | |
| 2012/0144205 A1 | 6/2012 | Shu et al. | |
| 2012/0151224 A1 | 6/2012 | Koifman et al. | |
| 2012/0151247 A1 | 6/2012 | Ferraiolo et al. | |
| 2012/0254862 A1 | 10/2012 | Dong | |
| 2013/0013934 A1 | 1/2013 | King et al. | |
| 2013/0152099 A1 | 6/2013 | Bass et al. | |
| 2014/0022976 A1 | 1/2014 | Chao et al. | |
| 2014/0059681 A1 | 2/2014 | Dubrovsky et al. | |
| 2014/0079220 A1 | 3/2014 | Wei et al. | |
| 2014/0089658 A1 | 3/2014 | Raghuram et al. | |
| 2014/0093074 A1 | 4/2014 | Gotze et al. | |
| 2014/0122902 A1 | 5/2014 | Isozaki et al. | |
| 2014/0133845 A1 | 5/2014 | Dahlfort et al. | |
| 2014/0136680 A1 | 5/2014 | Joshi et al. | |
| 2014/0258716 A1 | 9/2014 | MacMillan et al. | |
| 2014/0270177 A1 | 9/2014 | Brickell et al. | |
| 2014/0281456 A1 | 9/2014 | Mejia et al. | |
| 2014/0359182 A1 | 12/2014 | Georgiev | |
| 2015/0046702 A1 | 2/2015 | Paaske et al. | |
| 2015/0188718 A1 | 7/2015 | Falk | |
| 2015/0288526 A1 | 10/2015 | Mclean et al. | |
| 2015/0350231 A1 | 12/2015 | Dubrovsky et al. | |
| 2016/0019396 A1 | 1/2016 | Davis et al. | |
| 2016/0139982 A1 | 5/2016 | Yu et al. | |
| 2016/0246967 A1 | 8/2016 | Gross et al. | |
| 2016/0323096 A1 | 11/2016 | Kara-Ivanov et al. | |
| 2016/0364582 A1 | 12/2016 | Cammarota et al. | |
| 2017/0022494 A1 | 1/2017 | Hill et al. | |
| 2017/0026171 A1 | 1/2017 | Lal et al. | |
| 2017/0090815 A1 | 3/2017 | Kelner et al. | |
| 2017/0091489 A1 | 3/2017 | Dragone et al. | |
| 2017/0093567 A1 | 3/2017 | Gopal et al. | |
| 2017/0134409 A1 | 5/2017 | Dubrovsky et al. | |
| 2017/0149572 A1 | 5/2017 | Wallrabenstein | |
| 2017/0220494 A1 | 8/2017 | Shacham et al. | |
| 2018/0088978 A1 | 3/2018 | Li et al. | |
| 2018/0095750 A1 | 4/2018 | Drysdale et al. | |
| 2018/0107608 A1 | 4/2018 | Kaplan et al. | |
| 2018/0189104 A1 | 7/2018 | Agarwal et al. | |
| 2018/0204007 A1 | 7/2018 | Rangayyan | |
| 2018/0367516 A1 | 12/2018 | Mundra et al. | |
| 2019/0004810 A1 | 1/2019 | Jayasimha et al. | |
| 2019/0004973 A1 | 1/2019 | Chhabra et al. | |
| 2019/0042474 A1 | 2/2019 | Edirisooriya et al. | |
| 2019/0075183 A1 | 3/2019 | Silberkasten et al. | |
| 2019/0097818 A1 | 3/2019 | Lu et al. | |
| 2019/0102293 A1 | 4/2019 | Li et al. | |
| 2019/0102568 A1 | 4/2019 | Hausauer et al. | |
| 2019/0102577 A1 | 4/2019 | Gueron et al. | |
| 2019/0116052 A1 | 4/2019 | Kim et al. | |
| 2019/0130103 A1 | 5/2019 | Shen et al. | |
| 2019/0149478 A1 | 5/2019 | Mchugh et al. | |
| 2019/0165956 A1 | 5/2019 | Adham et al. | |
| 2019/0165957 A1 | 5/2019 | Abbott et al. | |
| 2019/0227827 A1 | 7/2019 | Zmudzinski et al. | |
| 2019/0281025 A1 | 9/2019 | Harriman et al. | |
| 2019/0311123 A1 | 10/2019 | Lal et al. | |
| 2019/0324725 A1 | 10/2019 | Wang | |
| 2019/0342093 A1 | 11/2019 | Chhabra et al. | |
| 2019/0347125 A1 | 11/2019 | Sankaran et al. | |
| 2019/0361807 A1 | 11/2019 | Desai et al. | |
| 2020/0004703 A1 | 1/2020 | Sankaran et al. | |
| 2020/0013451 A1 | 1/2020 | Son | |
| 2020/0034549 A1 | 1/2020 | Lu | |
| 2020/0052892 A1 | 2/2020 | Chhabra et al. | |
| 2020/0099658 A1 | 3/2020 | Couillard et al. | |
| 2020/0110888 A1 | 4/2020 | Kim et al. | |
| 2020/0134208 A1 | 4/2020 | Pappachan et al. | |
| 2020/0143067 A1 | 5/2020 | Alemzadeh et al. | |
| 2020/0159969 A1 | 5/2020 | Shanbhogue et al. | |
| 2020/0175646 A1 | 6/2020 | Boyd et al. | |
| 2020/0192842 A1 | 6/2020 | Ng et al. | |
| 2020/0226263 A1 | 7/2020 | Patel et al. | |
| 2020/0266995 A1 | 8/2020 | Gopal | |
| 2020/0272562 A1 | 8/2020 | La Fratta et al. | |
| 2020/0285492 A1 | 9/2020 | Mihajlovski et al. | |
| 2020/0319913 A1 * | 10/2020 | Kumar | G06F 9/45558 |
| 2020/0342117 A1 | 10/2020 | Richards et al. | |
| 2021/0004338 A1 | 1/2021 | Marolia et al. | |
| 2021/0149728 A1 | 5/2021 | Wood et al. | |
| 2021/0157935 A1 | 5/2021 | Sood et al. | |
| 2021/0224202 A1 | 7/2021 | Chhabra et al. | |
| 2021/0232694 A1 | 7/2021 | Jannyavula et al. | |

(56) References Cited

U.S. PATENT DOCUMENTS

| | | |
|---|---|---|
| 2021/0318966 A1 | 10/2021 | Chhabra et al. |
| 2021/0319138 A1 | 10/2021 | Dewan et al. |
| 2021/0342182 A1 | 11/2021 | Kumar et al. |
| 2021/0382836 A1 | 12/2021 | Lantz et al. |
| 2022/0035749 A1 | 2/2022 | Chhabra et al. |
| 2022/0100687 A1 | 3/2022 | Sahin et al. |
| 2022/0182232 A1 | 6/2022 | Marson et al. |
| 2022/0197825 A1 | 6/2022 | Dewan et al. |
| 2022/0198027 A1 | 6/2022 | Chhabra et al. |
| 2022/0209966 A1 | 6/2022 | Chhabra et al. |
| 2022/0209967 A1 | 6/2022 | Chhabra et al. |
| 2022/0209968 A1 | 6/2022 | Chhabra et al. |
| 2022/0209969 A1 | 6/2022 | Chhabra et al. |
| 2022/0318144 A1 | 10/2022 | Bajic et al. |
| 2022/0350503 A1 | 11/2022 | Tkacik et al. |
| 2022/0416997 A1 | 12/2022 | Dewan et al. |
| 2022/0417042 A1 | 12/2022 | Chhabra et al. |
| 2023/0032236 A1 | 2/2023 | Sankaran et al. |
| 2023/0032586 A1 | 2/2023 | Ranganathan et al. |
| 2023/0102178 A1 | 3/2023 | Chhabra et al. |
| 2023/0185603 A1 | 6/2023 | Gayen et al. |
| 2024/0004990 A1 | 1/2024 | Kakaiya |
| 2024/0054011 A1 | 2/2024 | Sankaran et al. |

FOREIGN PATENT DOCUMENTS

| | | |
|---|---|---|
| CN | 114647858 A | 6/2022 |
| CN | 115525335 A | 12/2022 |
| CN | 115686740 A | 2/2023 |
| CN | 117083612 A | 11/2023 |
| CN | 118696296 A | 9/2024 |
| DE | 102022112551 A1 | 12/2022 |
| EP | 3547130 A1 | 10/2019 |
| EP | 3720084 A1 | 10/2020 |
| EP | 3757849 A1 | 12/2020 |
| EP | 3757853 A1 | 12/2020 |
| EP | 4016358 A1 | 6/2022 |
| EP | 4124965 A1 | 2/2023 |
| EP | 4152167 A1 | 3/2023 |
| EP | 4242893 A2 | 9/2023 |
| EP | 3726392 A1 | 10/2023 |
| EP | 4322006 A1 | 2/2024 |
| GB | 2578135 A | 4/2020 |
| JP | 2021064378 A | 10/2022 |
| NL | 2029658 A | 7/2022 |
| WO | 2011160957 A1 | 12/2011 |
| WO | 2019066918 A1 | 4/2019 |
| WO | 2021035517 A1 | 3/2021 |
| WO | 2021080732 A1 | 4/2021 |
| WO | 2021162792 A1 | 8/2021 |
| WO | 2022132184 A1 | 6/2022 |
| WO | PCTUS2238546 | 7/2022 |
| WO | 2023009641 A1 | 2/2023 |
| WO | 2023113918 A1 | 6/2023 |
| WO | 2023173276 A1 | 9/2023 |

OTHER PUBLICATIONS

C. Priebe, K. Vaswani and M. Costa, "EnclaveDB: A Secure Database Using SGX," 2018 IEEE Symposium on Security and Privacy (SP), San Francisco, CA, USA, 2018, pp. 264-278.

Jack Keil Wolf, an introduction to error correcting codes, Part 1, ECE 154C, Spring 2008, 146 pages.

M. Werner, T. Unterluggauer, R. Schilling, D. Schaffenrath and S. Mangard, "Transparent memory encryption and authentication," 2017 27th International Conference on Field Programmable Logic and Applications (FPL), Ghent, Belgium, 2017, pp. 1-6.

European Search Report, Application No. EP22181090, issued Dec. 7, 2022, 7 pages.

"Intel Data Streaming Accelerator Preliminary Architecture Specification," retrieved from https://software.intel.com/sites/default/files/341204-intel-data-streaming-accelerator-spec-pdf on May 6, 2020, revision 1.0, Nov. 2019, 125 pages.

European Examination Report for app. No. 21198475.2, issued Jan. 4, 2024, 5 pages.

Extended European search report for application No. 23191363.3, issued Nov. 30, 2023, 11 pages.

International Preliminary Report on Patentability and Written Opinion (International app. No. PCT/US2022/021446, issued Dec. 14, 2023, 5 pages.

Notice of Allowance issued on Aug. 30, 2021 for U.S. Appl. No. 16/832,138.

Search report issued by the Dutch patent office per EPO report (application 2029658), dated Mar. 22, 2023, 11 pages (with machine translation of cover letter).

GDSII, retrieved from https://en.wikipedia.org/w/index.php?title=GDSII&oldid=1003588402 on Jun. 15, 2021.

Gunlu, Onur, et al. "Secure and Reliable Key Agreement with Physical Unclonable Functions," Entropy 2018, vol. 20, May 3, 2018, pp. 1-19.

Intel Architecture Memory Encryption Technologies, Document No. 336907-003US, Apr. 2021.

Intel Corporation. Intel® Architecture Memory Encryption Technologies Specification. Ref: #336907-001US. Rev 1.1. Dec. 2017. (Year: 2017).

Intel® Architecture Memory Encryption Technologies Specification, Revision 1.3, Apr. 2021.

International Preliminary Report on Patentability and written opinion (international application No. PCT/US2022/021531), issued Dec. 14, 2023, 5 pages.

Ionos, Hyperscale Computing—load balancing for large quantities of data, Aug. 24, 2020, downloaded Sep. 2, 2021, 8 pages.

J. Won, A. Singla, E. Bertino and G. Bollella, "Decentralized Public Key Infrastructure for Internet-of-Things," MILCOM 2018—2018 IEEE Military Communications Conference (MILCOM), Los Angeles, CA, USA, 2018, pp. 907-913.

J. Zhu et al., "Enabling Rack-scale Confidential Computing using Heterogeneous Trusted Execution Environment," 2020 IEEE Symposium on Security and Privacy (SP), 2020, pp. 1450-1465.

European Search Report for application No. 22188217.8-1203, issued Feb. 3, 2023, 16 pages.

"Intel® QuickAssist Technology (Intel® QAT)—Data Center Performance," downloaded Jun. 12, 2022, from "https://www.intel.com/content/www/us/en/architecture-and-technology/intel-quick-assist-technology-overview.html," 6 pages.

International Search Report for International application No. PCT/US2022/038546, mailed Nov. 18, 2022, 4 pages.

Written Opinion of the International Searching Authority for International application No. PCT/US2022/038546, mailed Nov. 18, 2022, 5 pages.

International Preliminary Report on Patentability for application No. PCT/US2020/066279, issued Jun. 13, 2023, 11 pages.

Partial European Search Report for application No. 23156058.2, issued Jul. 26, 2023, 14 pages.

Wikipedia, "Disk encryption theory," downloaded from "https://en.wikipedia.org/wiki/Disk_encryption_theory#XTS" on Jul. 25, 2023, 7 pages.

U.S. Appl. No. 17/357,973, filed Jun. 24, 2021, Prashant Dewan.

U.S. Appl. No. 17/358,238, filed Jun. 25, 2021, Siddhartha Chhabra.

Samsung Unveils Industry-First Memory Module Incorporating New CXL interconnect Standard, May 11, 2021, downloaded Jun. 13, 2021, from https://news.samsung.com, 5 pages.

U.S. Appl. No. 17/551,166, filed Dec. 14, 2021, Saurabh Gayen.

U.S. Appl. No. 17/711,928, filed Apr. 1, 2022, Narayan Ranganathan.

U.S. Appl. No. 17/854,159, filed Jun. 30, 2022, Utkarsh Y. Kakaiya.

U.S. Appl. No. 17/854,322, filed Jun. 30, 2022, Utkarsh Y. Kakaiya.

U.S. Appl. No. 17/875,198, filed Jul. 27, 2022, Rajesh M. Sankaran.

International Search Report for application No. PCT/US2022/047184, issued Feb. 15, 2023, 3 pages.

Written Opinion for application No. PCT/US2022/047184, issued Feb. 15, 2023, 6 pages.

International Search Report and Written Opinion issued on Jun. 24, 2022 for PCT/US2022/021446.

International Search Report and Written Opinion issued on Jun. 30, 2022 for PCT/US2022/021531.

(56) References Cited

OTHER PUBLICATIONS

Smart Data Accelerator Interface ("SDXI") Specification, Version 1.0, SNIA, Nov. 28, 2022, 144 pages.
Unterluggauer T, Werner M, Mangard S. Meas: memory encryption and authentication secure against side-channel attacks. J Cryptogr Eng. 2019;9(2):137-158. doi: 10.1007/s13389-018-0180-2. Epub Jan. 25, 2018. PMID: 31231603; PMCID: PMC6555441.
V. Krishnan, O. Serres and M. Blocksome, "COnfigurable Network Protocol Accelerator (COPA): An Integrated Networking/Accelerator Hardware/Software Framework," 2020 IEEE Symposium on High-Performance Interconnects (HOTI), 2020, pp. 17-24.
European Search Report for application No. 23156058.2, issued Oct. 26, 2023, 13 pages.
Extended European Search Report for Application No. 22188184. 0-1224, issued Jan. 25, 2023, 8 pages.
Extended European Search Report for application No. 22188217.8, issued May 8, 2023, 13 pages.
Extended European Search Report issued on Feb. 28, 2022 for EP Application No. 21198475.2.
International Search Report and Written Opinion issued by KIPO on Oct. 28, 2021 for corresponding PCT/US2020/066279, 18 pages.
Advanced Micro Devices, "Tiered Memory Page Migration Operations Guide," publication # 58151, Revision 0.51, May 2023, 33 pages.
European Patent Office examination report for Application No. 22188184.0, issued Jul. 22, 2024, 5 pages.
Final Office Action issued in U.S. Appl. No. 17/358,284 filed Feb. 22, 2024, 22 pages.
Intel Data Streaming Accelerator Architecture Specification, Revision 2.0, Sep. 2022, 253 pages.
Intel Scalable I/O Virtualization, Technical Specification, Rev. 1.1, Sep. 2020, 29 pages.
Intel TDX Connect Architecture Specification, Mar. 2023, 40 pages.
Zhao et al., "Contiguitas: The Pursuit of Physical Memory Contiguity in Datacenters," Jun. 2023, 15 pages.
"Intel Data Streaming Accelerator Architecture Specification," Revision 1.2, 197 pages, Sep. 2021.
"Smart Data Accelerator Interface ("SDXI") Specification," Version 0.9.0 rev 1, SNIA Advancing Storage & Information Technology, 109 pages.

IBM Cloud Education, "What is Multi-Tenant?" IBM Cloud Learn Hub, retrieved on Dec. 2, 2021 from https://www.ibm.com/cloud/learn/multi-tenant.
Iyer, Shyamkumar, "Introducing Smart Data Acceleration Interface (SDXI)," In-Memory Computing Summit (Oct. 28, 2020).
Jiang, David, "Introducing the Intel Data Streaming Accelerator (Intel DSA)," retrieved on Dec. 1, 2021 from https://01.org/blogs/2019/introducing-intel-data-streaming-accelerator.
Non-final Office Action issued in U.S. Appl. No. 17/133,627, filed Feb. 15, 2024, 23 pages.
Notice of Grant of NL application No. 2029658, Dutch Patent No. 2029658, issued Jun. 13, 2023, 6 pages.
Extended European Search Report, EP App. No. 22850259.7, Jan. 27, 2025, 9 pages.
Final Office Action, U.S. App. No. 17/875,198, filed Feb. 21, 2025, 44 pages.
Intel Corporation, "Intel Data Streaming Accelerator Architecture Specification", Revision 1.1, Oct. 2020, 194 pages.
Intel Corporation, "Intel Virtualization Technology for Directed I/O", Architecture Specification, Rev. 3.0, Jun. 2018, 275 pages.
Non-Final Office Action, U.S. App. No. 17/875,198, filed Sep. 3, 2024, 36 pages.
Office Action issued in U.S. Appl. No. 17/357,973, filed Oct. 1, 2024, 14 pages.
International Search Report for application No. PCT/CN2022/080895, 4 pages.
Written Opinion for application No. PCT/CN2022/080895, mailed Nov. 28, 2022, 4 pages.
European Examination Report for application No. 22181090.6, issued Oct. 9, 2024, 7 pages.
Non-Final Office Action in U.S. Appl. No. 17/711,928, mailed Aug. 26, 2024, 22 pages.
Non-Final Office Action issued in U.S. Appl. No. 17/478,828, mailed Oct. 31, 2024, 9 pages.
Non-Final Rejection in U.S. Appl. No. 17/483,123, mailed Nov. 25, 2024,. 9 pages.
Final Office Action issued in U.S. Appl. No. 17/133,627, issued Aug. 5, 2024, 27 pages.
Notice of Allowance for U.S. Appl. No. 17/482,370, issued Jul. 30, 2024, 8 pages.
Non-final office action for U.S. Appl. No. 17/358,238, mailed Aug. 8, 2024, 30 pages.

\* cited by examiner

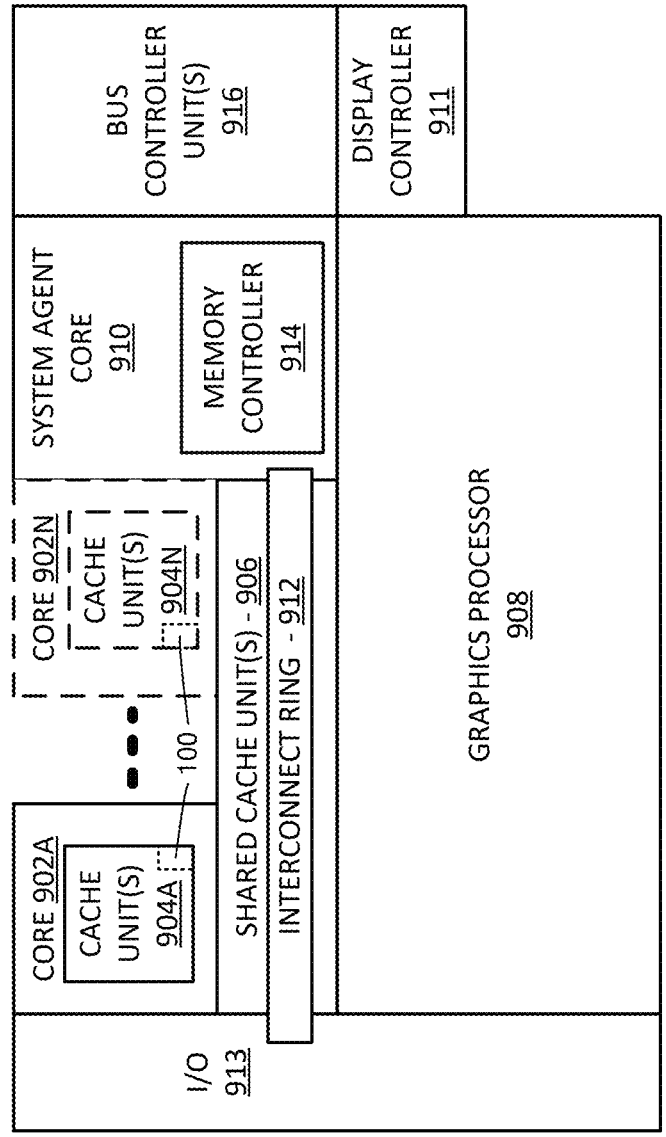
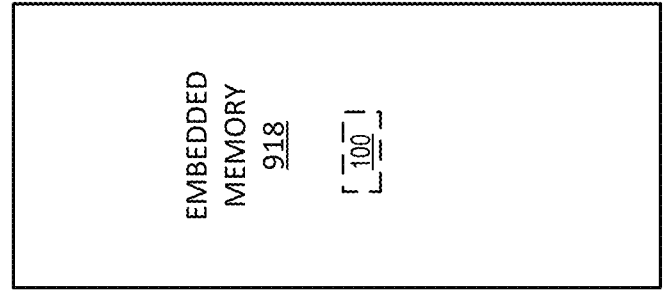
FIG. 9

SCALABLE ACCESS CONTROL CHECKING FOR CROSS-ADDRESS-SPACE DATA MOVEMENT

RELATED APPLICATION

The present application relates to and claims priority from U.S. Provisional Patent Application Ser. No. 63/226,159, filed Jul. 27, 2021, entitled "DATA STREAMING ACCELERATOR."

FIELD

The present disclosure generally relates to the field of computer processors. More particularly, an embodiment relates to scalable access control checking for cross-address-space data movement.

BACKGROUND

Generally, memory used to store data in a computing system can be volatile (to store volatile information) or non-volatile (to store persistent information). Volatile data structures stored in volatile memory are generally used for temporary or intermediate information that is required to support the functionality of a program during run-time of that program. On the other hand, persistent data structures stored in non-volatile (or persistent memory) are available beyond the run-time of a program and can be reused. Moreover, new data is typically generated as volatile data first, before a user or programmer decides to make the data persistent. For example, programmers or users may cause mapping (i.e., instantiating) of volatile structures in volatile main memory that is directly accessible by a processor. Persistent data structures, on the other hand, are instantiated on non-volatile storage devices like rotating disks attached to Input/Output (I/O or IO) buses or non-volatile memory-based devices like a solid state drive (SSD).

As computing capabilities are enhanced in processors, one concern or bottleneck is the speed at which memory may be accessed by a processor. For example, to process data, a processor may need to first fetch data from a memory device. After completion of the data processing, the results may need to be stored in the memory device. Therefore, the memory access speed and/or efficiency can have a direct impact on overall system performance.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIG. 9 is a block diagram of an embodiment of a processor having one or more processor cores, according to some embodiments.

DETAILED DESCRIPTION

Figure 1:
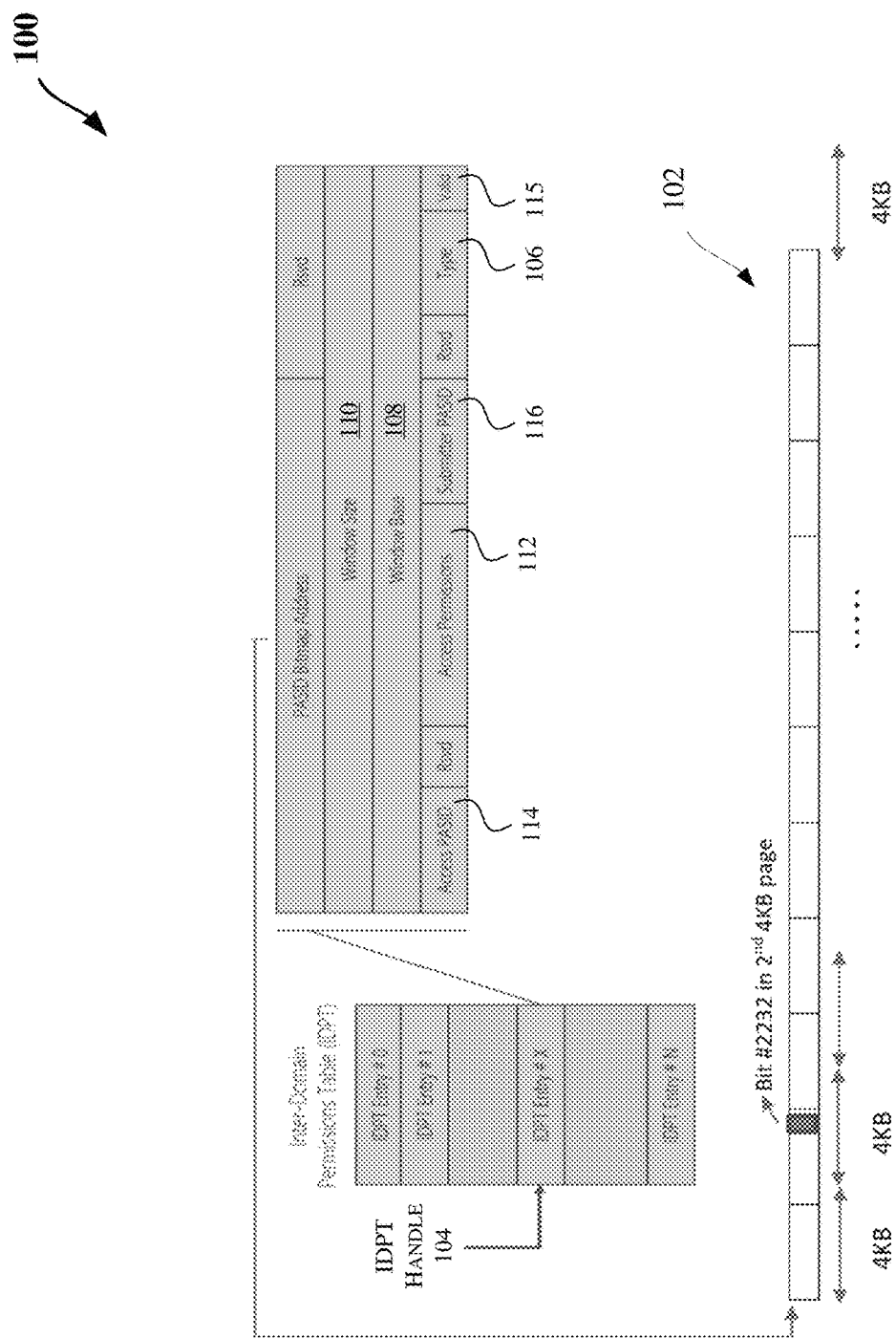
FIG. 1 illustrates a block diagram of an Inter-Domain Permissions Table (IDPT) with access control bitmaps, according to an embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

As computing capabilities are enhanced in processors, one concern or bottleneck is the speed at which memory may be accessed by a processor. Therefore, the memory access speed and/or efficiency can have a direct impact on overall system performance. A data mover device/accelerator such as Data Streaming Accelerator (DSA) (provided by Intel® Corporation) can address bottlenecks by supporting data movement between address spaces (denoted by Process Address Space Identifiers (PASIDs)). For DSA, this capability is referred to as the "Inter-Domain capability." For example, the Inter-Domain capability allows a descriptor submitted by a process with PASID x to access address spaces for PASIDs other than PASID x. One issue with existing solutions is that when multiple processes need access to a common target address space, such solutions run into scaling challenges ($O(N^2)$) due to the requirement to setup a 1:1 type of connection between each address space pair (where "O" refers to the order of scaling and "N" refers to the number of submitters (e.g., processes) that want to communicate with each other).

To this end, some embodiments provide one or more techniques for scalable access control checking for cross-address-space data movement. An embodiment allows a single Inter-Domain Permissions Table (IDPT) entry to be used by multiple submitters, while providing a scalable mechanism to perform access control checks.

Generally, a cross-address-space data movement can be facilitated through the following features in DSA:

(a) Support for a PASID permissions table (e.g., IDPT) to manage the connection between the requesting ("submitter") PASIDs and the target ("access") PASID. IDPT, in turn, provides security as well as access control and may be used to control the address range allowed to be accessed in the target PASID.

(b) Support for device descriptors that allow software (such as a device driver or another software application) to specify the targeted PASID space for a source or destination buffer using an opaque handle (e.g., a PASID selector) that denotes the connection between the two PASIDs.

Further, an entry in the IDPT typically refers to a 1:1 connection, i.e., between a unique submitter PASID and a unique access PASID. In this case, the entry contains the submitter PASID value that is allowed to use that entry, and hardware circuitry performs access control checks by ensuring that the PASID associated with a descriptor submitted by a software client matches the submitter PASID value stored in that IDPT entry. Using the above scheme, if a process wants to provide access to a portion of its memory region or the entire memory region to multiple PASIDs, then the process creates multiple entries in the IDPT, one per submitter PASID to which the process wishes to grant access.

Additionally, to make it easier for privileged software (e.g., an Operating System (OS) kernel) to use such a device capability to speed up data movement or other operations between user buffers located in different PASIDs or between a user buffer and a kernel-owned buffer, DSA supports a special set of descriptors where privileged software can specify the target (access) PASIDs directly in the descriptor. When such software is run in a virtual environment, the underlying host OS/hypervisor may wish to restrict the set of access PASIDs that a guest OS is allowed to specify in these descriptors. One way of doing this is to create multiple entries in the IDPT, one per access PASID that the host OS/hypervisor wishes to allow the guest OS to access.

However, creating multiple IDPT entries for the same memory region (one per submitter) requires the IDPT to scale by $O(N^2)$ entries as discussed above. Additionally, if an owner process wants to update the memory region to which the owner process wishes to grant access (e.g., change the location of the memory region, grow or shrink the region, etc.), this process needs to update each of the 'N' entries to reflect the change to all the submitter PASIDs to which it is connected. This can be quite onerous and impact performance for workloads desiring high-throughput cross-address-space data movement. All of these add to hardware cost (i.e., $O(N^2)$ scaling), software cost (e.g., creating, updating, deleting $O(N^2)$ entries), and increase complexity. A similar argument can be made regarding use of multiple IDPT entries by a guest OS in a virtualized environment.

To address one or more of the aforementioned issues, at least one embodiment provides a novel scheme to allow a single IDPT entry to be used by multiple submitters, while providing a scalable mechanism to perform access control checks. To achieve this, an access control bitmap is introduced with each bit in the bitmap indicating whether a submitter with an identifier corresponding to that bit is allowed to use a corresponding IDPT entry in an embodiment. For Inter-Domain operations across different PASIDs, the bitmap is referred to herein as a "PASID bitmap."

In one embodiment, for guest OS uses of the Inter-Domain capability, a similar bitmap may be used by the guest OS/hypervisor to restrict the set of access PASIDs that the guest OS is allowed to access. In another embodiment, a guest OS is allowed to set up the bitmap and the hypervisor can shadow/check the access by the guest OS.

In an embodiment, system software (such as OS, a device driver, and/or hypervisor) manages allocation and configuration of the bitmap virtual memory range and utilizes a sparse memory mapping so that only the actively used portions of the bitmap (e.g., in page sized chunks) are required to have the physical memory mapped to them.

At least one embodiment allows N:1 connections (or sometimes referred to as "relationship" or "relationships" herein) between a single target address space (Access PASID) and multiple requester address spaces (Submitter PASIDs) with a single IDPT entry. Hence, the size of the IDPT table only needs to scale by $O(N)$ instead of $O(N^2)$ without this scheme. Moreover, the bitmap can be sparsely populated on demand, and a single bitmap may be used with multiple IDPT entries, if appropriate. By using a single IDPT entry to share a memory region with multiple PASIDs, software (such as a device driver or another software application) can use hardware-direct mechanisms to update attributes such as window base, window size, access permissions for that single IDPT entry (such as shown in FIG. 1). As discussed herein, a "window" generally refers to a region of memory within the target address space that is made available for access from a different address space. Additional submitters may be added dynamically without impacting existing submitter processes. This would increase flexibility, lower hardware and software complexity, and/or improves performance.

FIG. 1 illustrates a block diagram of an Inter-Domain Permissions Table (IDPT) 100 with access control bitmaps, according to an embodiment. One or more memory devices (such as those discussed with reference to FIG. 6B et seq. may include the IDPT 100). One embodiment defines a scalable mechanism for a process to set up a cross-address space connection with multiple processes (or N:1 connection) to reduce overhead. The access control bitmap 102 includes a plurality of bits, where each bit in the bitmap indicates whether access is allowed for the submitter corresponding to that bit. For Inter-Domain operations across different PASID spaces, the bitmap is referred to as a "PASID bitmap". In an embodiment, the maximum size of a PASID bitmap region corresponds to the maximum possible number of PASIDs. For example, for a 20-bit PASID space (as defined by the Peripheral Component Interface express (PCI-Express or PCIe) specification), the bitmap region can have a maximum size of $2^{20}$ bits or 128 Kilobytes (KB). Each entry in an IDPT can optionally point to a PASID bitmap region if that entry is intended to be shared with multiple PASIDs. A bitmap region may be represented by a (e.g., virtually) contiguous memory range that may be mapped through Input/Output Memory Management Unit (IOMMU) page tables to a set of non-contiguous (e.g., physical) pages in memory. Moreover, the entire bitmap region does not need to have physical memory backing set up a priori; rather, memory can be allocated on-demand in page size chunks (e.g., 4 KB).

Moreover, while processing an Inter-Domain descriptor containing an IDPT handle 104, processor hardware looks up the IDPT entry to verify access permissions for the requesting PASID. If the type of the IDPT entry specifies a N: 1 type of entry (e.g., in the type field 106), processor hardware converts the requesting PASID value to an offset from the base of a PASID bitmap region specified in the IDPT entry. For example, a submitter PASID value of 35000 may point to bit #35000 from the start of the bitmap region which corresponds to bit #2232 in the $2^{nd}$ 4 KB page from the start of the bitmap region as shown in FIG. 1. Processor hardware can read the corresponding location from the bitmap and if that bit is 1 (or 0 depending on the implementation), it indicates that the corresponding PASID is allowed to use that IDPT entry. If the bit is 0 (or 1 depending on the implementation), access is denied. In one embodiment, if processor hardware finds that the bitmap page is not present, e.g., the processor encounters a page fault during a bitmap read, the processor treats that as reading all 0s and denies access to the requesting process. While some embodiments discuss various operations being done by a processor, processor core, or processor hardware, embodiments are not limited to this and any hardware circuitry (e.g., a Network Interface Card (NIC) or hardware circuitry in a NIC) may be used to perform the various operations.

As shown in FIG. 1, an IDPT entry may also include other fields (some of which may be configurable/updatable by software using hardware-direct mechanisms) such as window base 108, window size 110, access permissions 112, access PASID 114, a valid field 115 (e.g., indicating whether that entry is initialized, in-use, or not in-use; if not in use, it is available for allocation), and/or Submitter PASID 116.

Similarly, for guest OS uses of Inter-Domain operations, a hypervisor can set up an IDPT entry with a bitmap having only the bits corresponding to the PASIDs that the hypervisor wants to allow the guest OS to access, e.g., set to 1. The guest OS is then allowed to utilize hardware offloads to accelerators like DSA to perform operations with only those set of PASIDs. Attempts by the guest OS to access any other PASIDs not allowed in the bitmap will be rejected by the processor.

In at least one embodiment, access to the bitmap region may be controlled by system software through IOMMU page table mappings and optionally, may place the bitmap region itself in a separate address space through the use of a special PASID allocated by system software for this purpose. This can further strengthen the security perimeter with this scheme by limiting access to the bitmap region to only the specific privileged software components responsible for bitmap management. To reduce the overhead associated with address translation, the IOMMU mapping for the bitmap region may be set up by system software to be an identity mapping, e.g., a virtual address would be the same as a corresponding physical address, when so desired.

Furthermore, embodiments may be also extended for cases where a submitter is represented by something other than a PASID. For example, one such scheme could be used with inter-node or cluster operations where the submitter identifier may be a node identifier (ID), such as a machine identifier, network identifier, virtual-machine identifier, etc.

System Software Implications

When a computing device uses a bitmap to track PASIDs for access permission, a significant amount of system memory may be consumed using standard memory allocation. There can be $2^{20}$ bits allocated for a PASID range with the PASID defined as a 20-bit value in accordance with the PCIe specification. Each of these bitmaps takes up 131072 bytes (128 KB) to represent all $2^{20}$ bits of the PASID range. If a computing device supports a significant number of these bitmaps (e.g., 1024 entries) and if the computing system also supports multiple of these devices, the amount of system memory consumed by a driver for the device may expand in the range of many gigabytes.

A 128 KB bitmap requires 32 4 KB memory pages. Finding a physically contiguous 128 KB memory region becomes difficult the longer a system has been running due to memory fragmentation. Also, it is possible that not all these memory pages are being used since a typical operation would not expect $2^{20}$ PASIDs being utilized; hence, many reserved memory pages would remain unutilized.

In at least one embodiment, to conserve memory, a sparse memory mapping can be introduced. A contiguous virtual memory range may be backed only by physical memory pages that are in use. A virtual mapping is visible to the Central Processing Unit (CPU), a device supporting Shared Virtual Memory (SVM), or an optional Input/Output (IO) Virtual Memory (IOVA) mapping (which can be accessed by the device through the system IOMMU). As mentioned above, the device may treat any page that is not mapped as if it contains all 0s.

Figure 2:
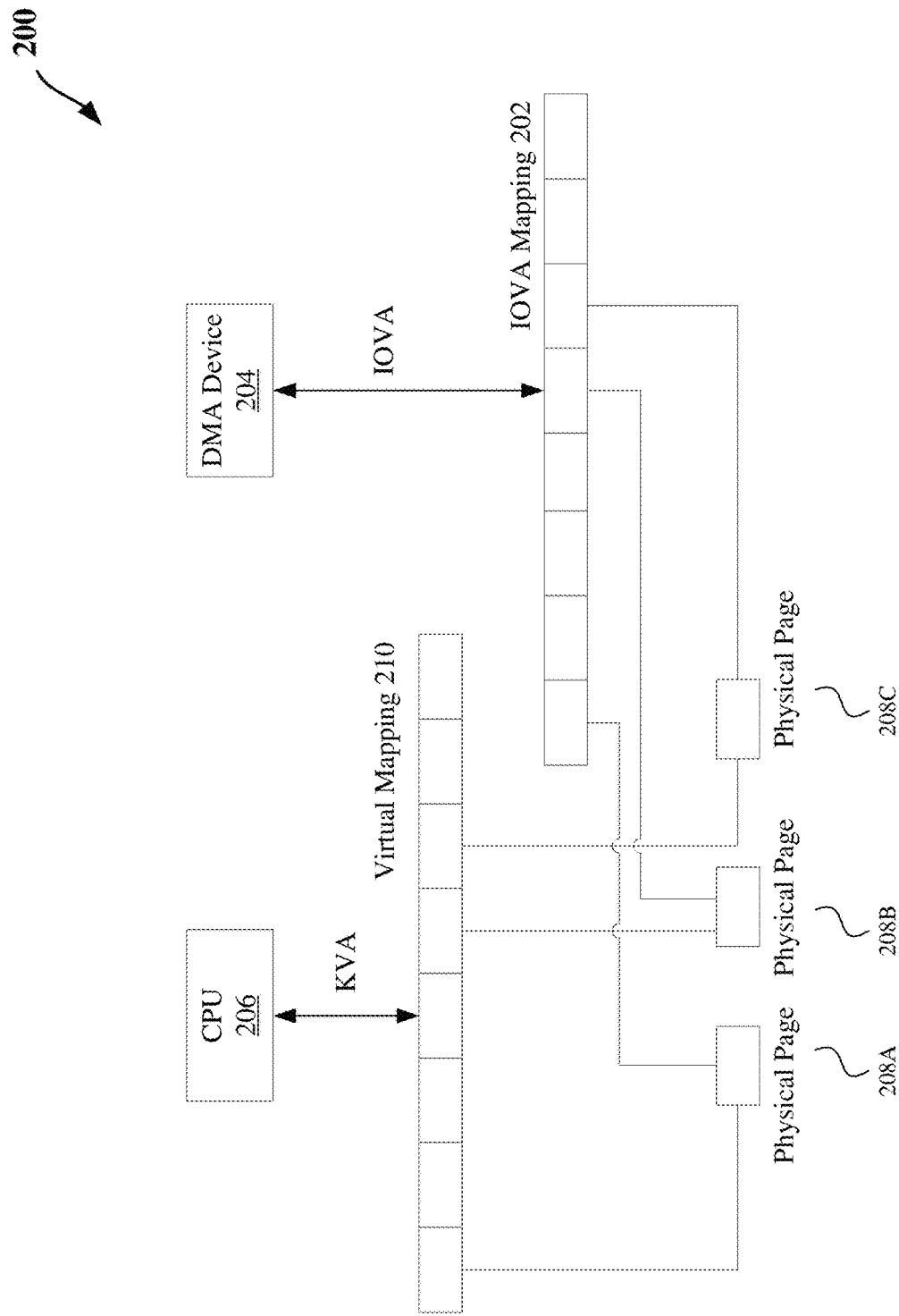
FIG. 2 illustrates a block diagram of an Input/Output Virtual Memory (IOVA) based sparse mapping, according to an embodiment.

FIG. 2 illustrates a block diagram of an Input/Output Virtual Memory (IOVA) based sparse mapping 200, according to an embodiment.

As shown in FIG. 2, an IO Virtual Address (IOVA) mapping 202 is created to allow Direct Memory Access (DMA) device 204 access to the bitmap. Unlike a common memory mapping where the entire address range is backed by physical memory pages, the IOVA range is a sparse mapping that only has selective physical pages with the needed PASID bits backing the address range. Additional physical pages can be added or removed as desired. The CPU 206 can access the physical pages 208A-208C through the Kernel Virtual Address (KVA) virtual mapping 210 in order to modify the bitmap. Hence, as shown in FIG. 2, a device may have two ways to access a mapping in some embodiments, including via one of the IOVA based sparse mapping 202 or KVA based virtual mapping 210.

Figure 3:
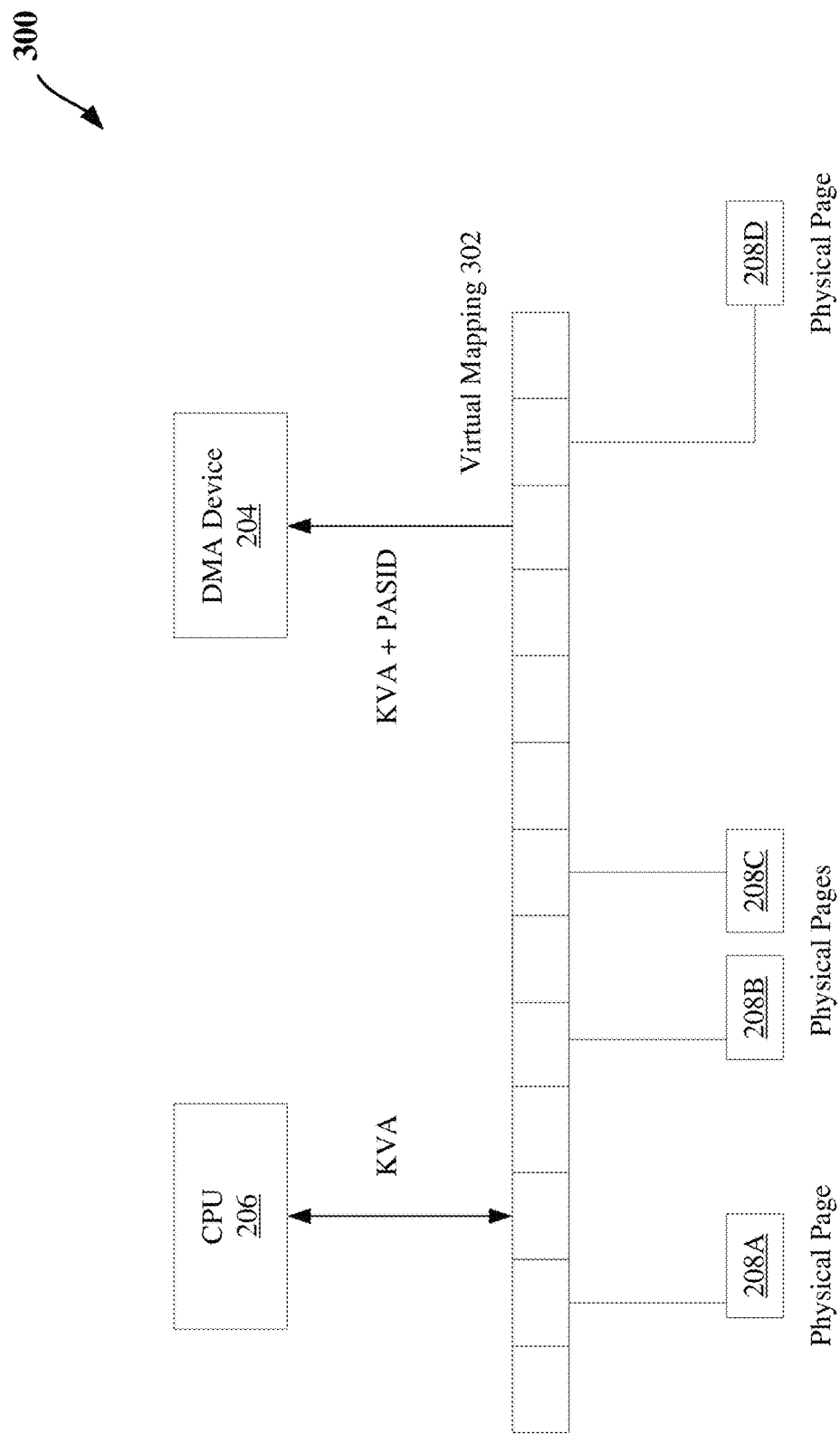
FIG. 3 illustrates a block diagram of a Kernel Virtual Address (KVA) based mapping, according to an embodiment.

FIG. 3 illustrates a block diagram of a Kernel Virtual Address (KVA) based mapping 300, according to an embodiment. In one embodiment, a Kernel Virtual Address (KVA) mapping is created with sparse mapping. The DMA device 204 may access the bitmap 302 via DMA by using KVA plus PASID, which may be programmed to a configuration register in an embodiment (not shown). In an embodiment, DSA may implement the DMA device 204. The CPU 206 accesses the physical pages 208A-208D through KVA for modification.

Figure 4:
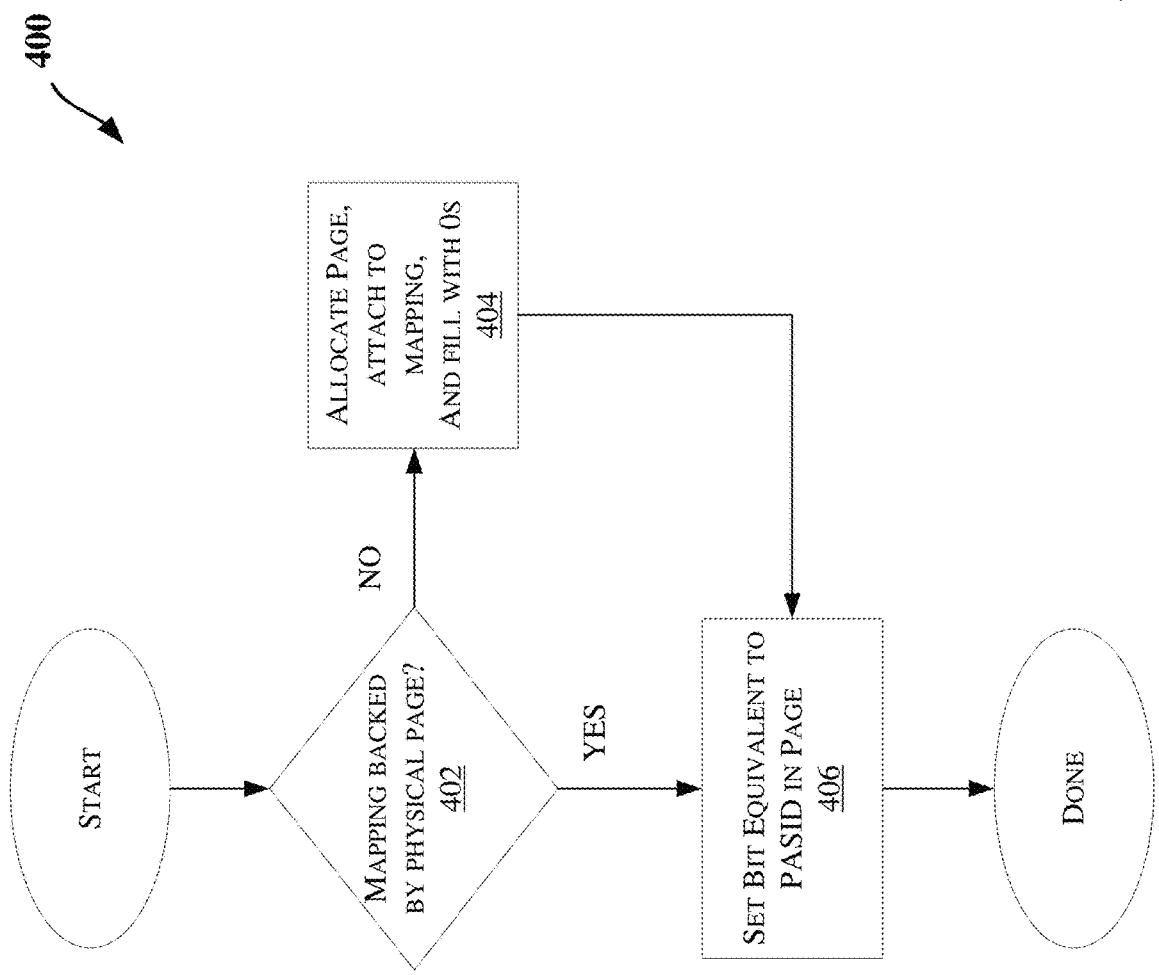
FIG. 4 illustrates a flow diagram of a method to setup a sparse mapping according to an embodiment.

FIG. 4 illustrates a flow diagram of a method 400 to set up a sparse mapping according to an embodiment. The operations of method 400 may be performed by logic (including software) in one or more embodiments.

Referring to FIG. 4, at operation 402, it is determined whether the address for a bit to be set is backed by a physical page. If the mapping is not backed by a physical page, operation 404 allocates a page and attaches the page to the mapping (e.g., where the new page is filled with all zeros in an embodiment). At an operation 406, the bit that corresponds to the PASID is set (e.g., to a 1). As shown, if the mapping is determined to be backed by a physical page at operation 402, method 400 resumes with operation 406.

Figure 5:
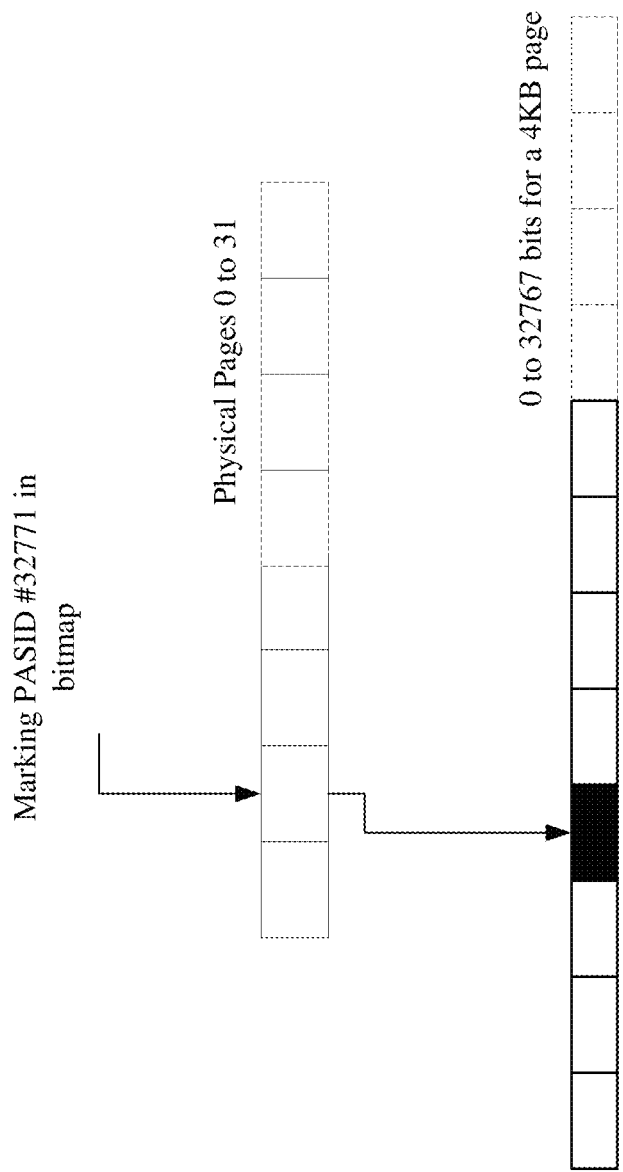
FIG. 5 illustrates an example for marking an identifier in a bitmap according to an embodiment.

FIG. 5 illustrates an example for marking an identifier in a bitmap according to an embodiment. As shown, a PASID 32771 bit in the bitmap is to be set. Theoretically, there can be up to 32 4 KB pages to satisfy the $2^{20}$ bits as mentioned above. In this example, logic (including software) determines that the bit representing PASID #32771 resides in the second 4 KB page for the entire bitmap and then determines that the $4^{th}$ bit in that page will be set.

Additionally, some embodiments may be applied in computing systems that include one or more processors (e.g., where the one or more processors may include one or more processor cores), such as those discussed with reference to FIG. 1 et seq., including for example a desktop computer, a workstation, a computer server, a server blade, or a mobile computing device. The mobile computing device may include a smartphone, tablet, UMPC (Ultra-Mobile Personal Computer), laptop computer, Ultrabook™ computing device, wearable devices (such as a smart watch, smart ring, smart bracelet, or smart glasses), etc.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU (Central Processing Unit) including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

Figure 6:
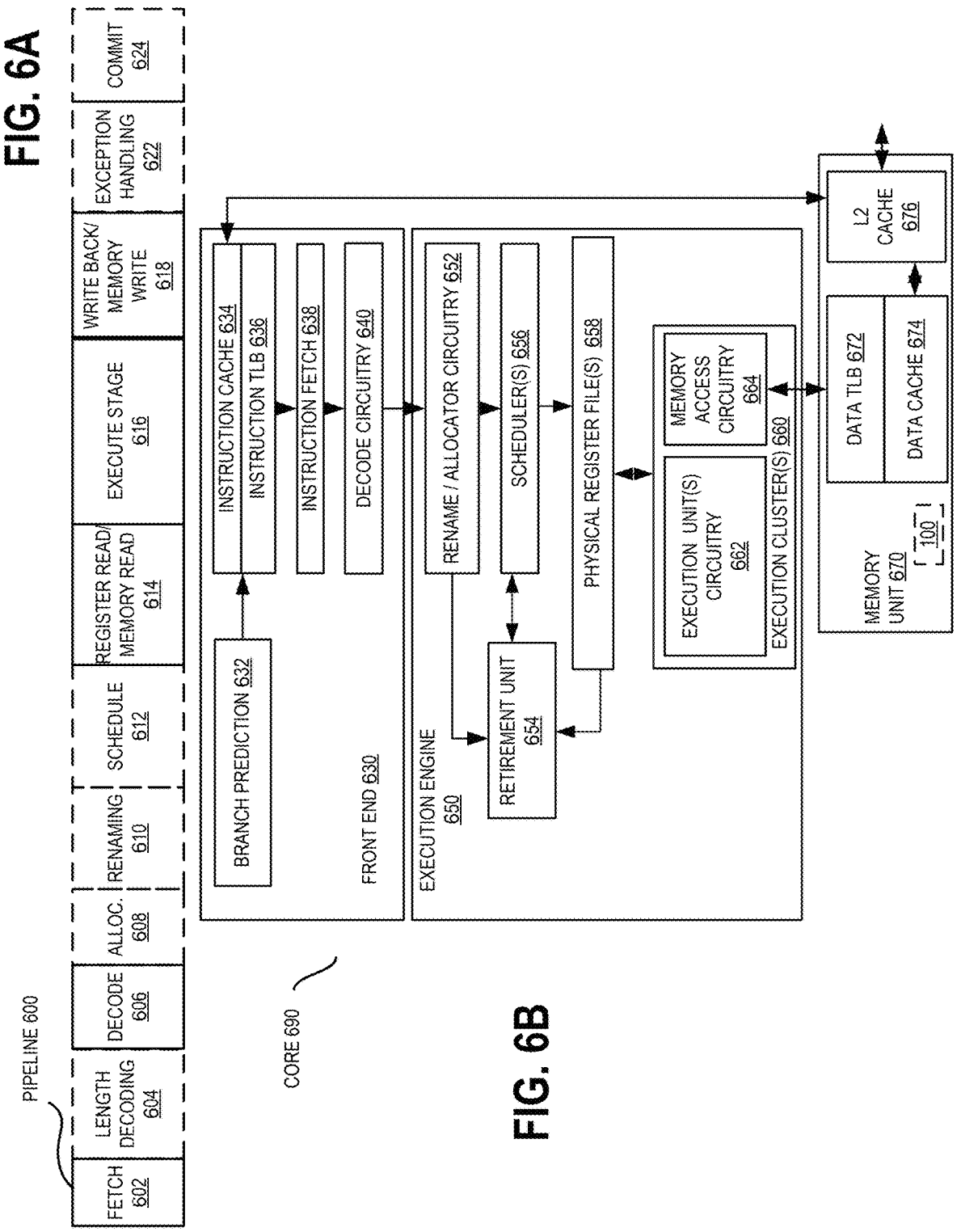
FIG. 6A is a block diagram illustrating both an exemplary in-order pipeline and an exemplary register renaming, out-of-order issue/execution pipeline according to embodiments.
FIG. 6B is a block diagram illustrating both an exemplary embodiment of an in-order architecture core and an exemplary register renaming, out-of-order issue/execution architecture core to be included in a processor according to embodiments.

FIG. 6A is a block diagram illustrating both an exemplary in-order pipeline and an exemplary register renaming, out-of-order issue/execution pipeline according to embodiments. FIG. 6B is a block diagram illustrating both an exemplary embodiment of an in-order architecture core and an exemplary register renaming, out-of-order issue/execution architecture core to be included in a processor according to embodiments. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

FIG. 6B shows processor core 690 including a front end unit 630 coupled to an execution engine unit 650, and both are coupled to a memory unit 670. The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 690 includes a microcode ROM or other medium that stores microcode for certain macroinstructions (e.g., in decode unit 640 or otherwise within the front end unit 630). The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 658 comprises a vector registers unit, a writemask registers unit, and a scalar registers unit. These register units may provide architectural vector registers, vector mask registers, and general purpose registers. The physical register file(s) unit(s) 658 is overlapped by the retirement unit 654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The instruction cache unit 634 is further coupled to a level 2 (L2) cache unit 676 in the memory unit 670. The L2 cache unit 676 is coupled to one or more other levels of cache and eventually to a main memory.

By way of example, the exemplary register renaming, out-of-order issue/execution core architecture may implement the pipeline 600 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 6) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 690 includes logic to support a packed data instruction set extension (e.g., AVX1, AVX2), thereby allowing the operations used by many multimedia applications to be performed using packed data.

Figure 7:
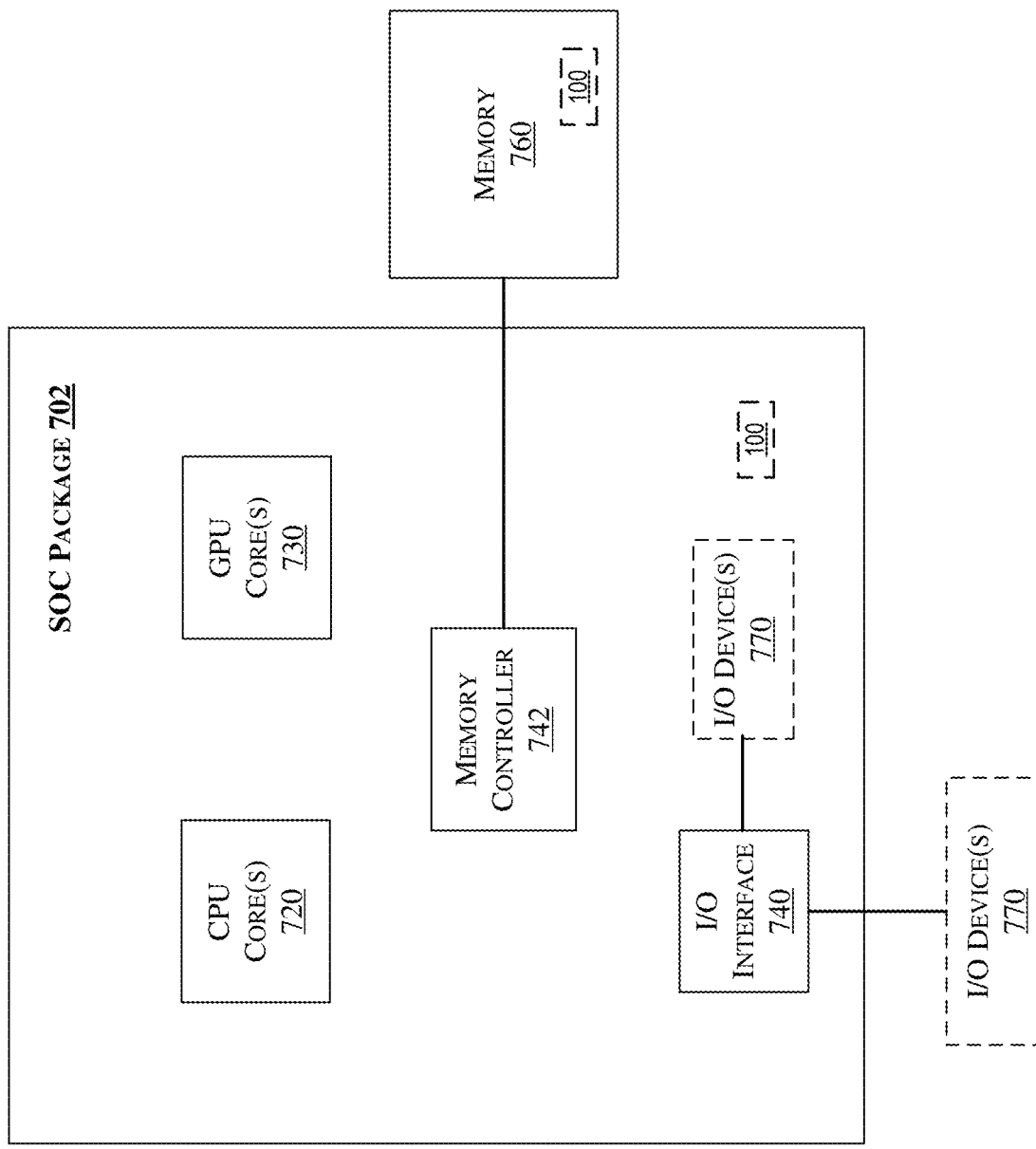
FIG. 7 illustrates a block diagram of an SOC (System On Chip) package in accordance with an embodiment.

FIG. 7 illustrates a block diagram of an SOC package in accordance with an embodiment. As illustrated in FIG. 7, SOC 702 includes one or more Central Processing Unit (CPU) cores 720, one or more Graphics Processor Unit (GPU) cores 730, an Input/Output (I/O) interface 740, and a memory controller 742. Various components of the SOC package 702 may be coupled to an interconnect or bus such as discussed herein with reference to the other figures. Also, the SOC package 702 may include more or less components, such as those discussed herein with reference to the other figures. Further, each component of the SOC package 702 may include one or more other components, e.g., as discussed with reference to the other figures herein. In one embodiment, SOC package 702 (and its components) is provided on one or more Integrated Circuit (IC) die, e.g., which are packaged into a single semiconductor device.

As illustrated in FIG. 7, SOC package 702 is coupled to a memory 760 via the memory controller 742. In an embodiment, the memory 760 (or a portion of it) can be integrated on the SOC package 702.

The I/O interface 740 may be coupled to one or more I/O devices 770, e.g., via an interconnect and/or bus such as discussed herein with reference to other figures. I/O device(s) 770 may include one or more of a keyboard, a mouse, a touchpad, a display, an image/video capture device (such as a camera or camcorder/video recorder), a touch screen, a speaker, or the like.

Figure 8:
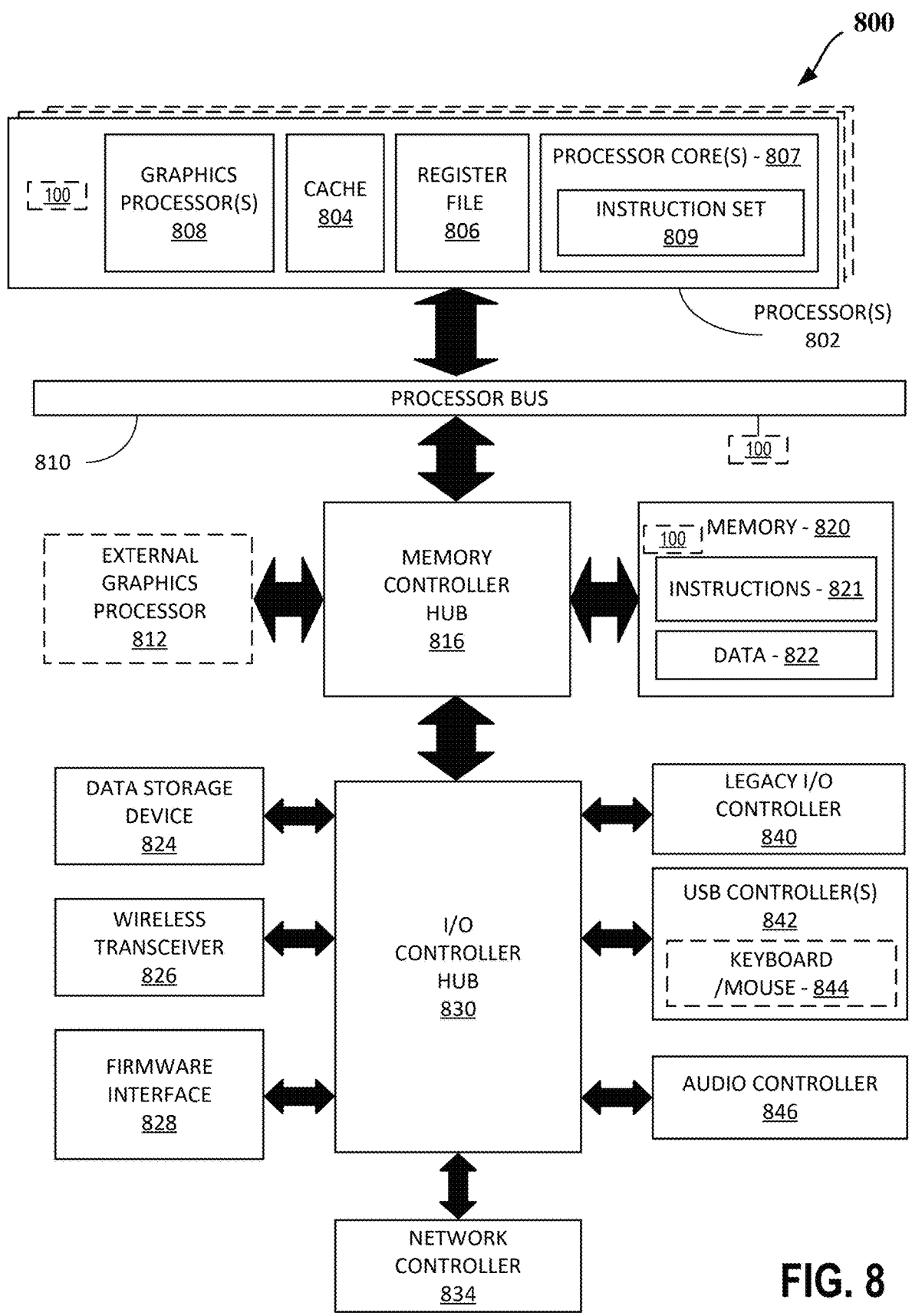
FIG. 8 is a block diagram of a processing system, according to an embodiment.

FIG. 8 is a block diagram of a processing system 800, according to an embodiment. In various embodiments the system 800 includes one or more processors 802 and one or more graphics processors 808, and may be a single processor desktop system, a multiprocessor workstation system, or a server system having a large number of processors 802 or processor cores 807. In on embodiment, the system 800 is a processing platform incorporated within a system-on-a-chip (SoC or SOC) integrated circuit for use in mobile, handheld, or embedded devices.

An embodiment of system 800 can include, or be incorporated within a server-based gaming platform, a game console, including a game and media console, a mobile gaming console, a handheld game console, or an online game console. In some embodiments system 800 is a mobile phone, smart phone, tablet computing device or mobile Internet device. Data processing system 800 can also include, couple with, or be integrated within a wearable device, such as a smart watch wearable device, smart eyewear device, augmented reality device, or virtual reality device. In some embodiments, data processing system 800 is a television or set top box device having one or more processors 802 and a graphical interface generated by one or more graphics processors 808.

In some embodiments, the one or more processors 802 each include one or more processor cores 807 to process instructions which, when executed, perform operations for system and user software. In some embodiments, each of the one or more processor cores 807 is configured to process a specific instruction set 809. In some embodiments, instruction set 809 may facilitate Complex Instruction Set Computing (CISC), Reduced Instruction Set Computing (RISC), or computing via a Very Long Instruction Word (VLIW). Multiple processor cores 807 may each process a different instruction set 809, which may include instructions to facilitate the emulation of other instruction sets. Processor core 807 may also include other processing devices, such a Digital Signal Processor (DSP).

In some embodiments, the processor 802 includes cache memory 804. Depending on the architecture, the processor 802 can have a single internal cache or multiple levels of internal cache. In some embodiments, the cache memory is shared among various components of the processor 802. In some embodiments, the processor 802 also uses an external cache (e.g., a Level-3 (L3) cache or Last Level Cache (LLC)) (not shown), which may be shared among processor cores 807 using known cache coherency techniques. A register file 806 is additionally included in processor 802 which may include different types of registers for storing different types of data (e.g., integer registers, floating point registers, status registers, and an instruction pointer register). Some registers may be general-purpose registers, while other registers may be specific to the design of the processor 802.

In some embodiments, processor 802 is coupled to a processor bus 810 to transmit communication signals such as address, data, or control signals between processor 802 and other components in system 800. In one embodiment the system 800 uses an exemplary 'hub' system architecture, including a memory controller hub 816 and an Input Output (I/O) controller hub 830. A memory controller hub 816 facilitates communication between a memory device and other components of system 800, while an I/O Controller Hub (ICH) 830 provides connections to I/O devices via a local I/O bus. In one embodiment, the logic of the memory controller hub 816 is integrated within the processor.

Memory device 820 can be a dynamic random access memory (DRAM) device, a static random access memory (SRAM) device, flash memory device, phase-change memory device, or some other memory device having suitable performance to serve as process memory. In one embodiment the memory device 820 can operate as system memory for the system 800, to store data 822 and instructions 821 for use when the one or more processors 802 executes an application or process. Memory controller hub 816 also couples with an optional external graphics processor 812, which may communicate with the one or more graphics processors 808 in processors 802 to perform graphics and media operations.

In some embodiments, ICH 830 enables peripherals to connect to memory device 820 and processor 802 via a high-speed I/O bus. The I/O peripherals include, but are not limited to, an audio controller 846, a firmware interface 828, a wireless transceiver 826 (e.g., Wi-Fi, Bluetooth), a data storage device 824 (e.g., hard disk drive, flash memory, etc.), and a legacy I/O controller 840 for coupling legacy (e.g., Personal System 2 (PS/2)) devices to the system. One or more Universal Serial Bus (USB) controllers 842 connect input devices, such as keyboard and mouse 844 combinations. A network controller 834 may also couple to ICH 830. In some embodiments, a high-performance network controller (not shown) couples to processor bus 810. It will be appreciated that the system 800 shown is exemplary and not limiting, as other types of data processing systems that are differently configured may also be used. For example, the I/O controller hub 830 may be integrated within the one or more processor 802, or the memory controller hub 816 and I/O controller hub 830 may be integrated into a discreet external graphics processor, such as the external graphics processor 812.

FIG. 9 is a block diagram of an embodiment of a processor 900 having one or more processor cores 902A to 902N, an integrated memory controller 914, and an integrated graphics processor 908. Those elements of FIG. 9 having the same reference numbers (or names) as the elements of any other figure herein can operate or function in any manner similar to that described elsewhere herein, but are not limited to such. Processor 900 can include additional cores up to and including additional core 902N represented by the dashed lined boxes. Each of processor cores 902A to 902N includes one or more internal cache units 904A to 904N. In some embodiments each processor core also has access to one or more shared cached units 906.

The internal cache units 904A to 904N and shared cache units 906 represent a cache memory hierarchy within the processor 900. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 906 and 904A to 904N.

In some embodiments, processor 900 may also include a set of one or more bus controller units 916 and a system agent core 910. The one or more bus controller units 916 manage a set of peripheral buses, such as one or more Peripheral Component Interconnect buses (e.g., PCI, PCI Express). System agent core 910 provides management functionality for the various processor components. In some embodiments, system agent core 910 includes one or more integrated memory controllers 914 to manage access to various external memory devices (not shown).

In some embodiments, one or more of the processor cores 902A to 902N include support for simultaneous multi-threading. In such embodiment, the system agent core 910 includes components for coordinating and operating cores 902A to 902N during multi-threaded processing. System agent core 910 may additionally include a power control unit (PCU), which includes logic and components to regulate the power state of processor cores 902A to 902N and graphics processor 908.

In some embodiments, processor 900 additionally includes graphics processor 908 to execute graphics processing operations. In some embodiments, the graphics processor 908 couples with the set of shared cache units 906, and the system agent core 910, including the one or more integrated memory controllers 914. In some embodiments, a display controller 911 is coupled with the graphics processor 908 to drive graphics processor output to one or more coupled displays. In some embodiments, display controller 911 may be a separate module coupled with the graphics processor via at least one interconnect, or may be integrated within the graphics processor 908 or system agent core 910.

In some embodiments, a ring based interconnect unit 912 is used to couple the internal components of the processor 900. However, an alternative interconnect unit may be used, such as a point-to-point interconnect, a switched interconnect, or other techniques, including techniques well known in the art. In some embodiments, graphics processor 908 couples with the ring interconnect 912 via an I/O link 913.

The exemplary I/O link 913 represents at least one of multiple varieties of I/O interconnects, including an on package I/O interconnect which facilitates communication between various processor components and a high-performance embedded memory module 918, such as an eDRAM (or embedded DRAM) module. In some embodiments, each of the processor cores 902 to 902N and graphics processor 908 use embedded memory modules 918 as a shared Last Level Cache.

In some embodiments, processor cores 902A to 902N are homogenous cores executing the same instruction set architecture. In another embodiment, processor cores 902A to 902N are heterogeneous in terms of instruction set architecture (ISA), where one or more of processor cores 902A to 902N execute a first instruction set, while at least one of the other cores executes a subset of the first instruction set or a different instruction set. In one embodiment processor cores 902A to 902N are heterogeneous in terms of microarchitecture, where one or more cores having a relatively higher power consumption couple with one or more power cores having a lower power consumption. Additionally, processor 900 can be implemented on one or more chips or as an SoC integrated circuit having the illustrated components, in addition to other components.

Figure 10:
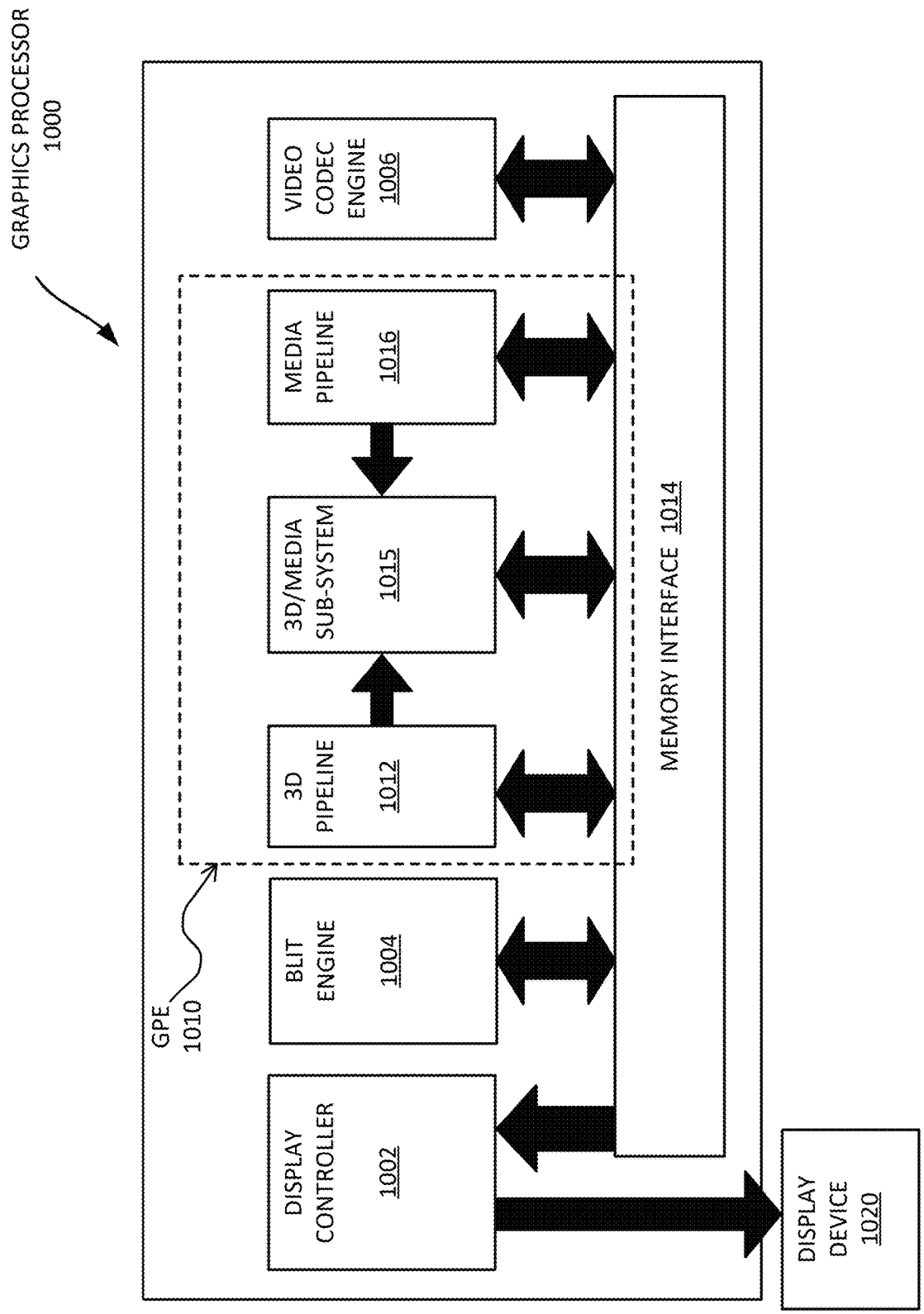
FIG. 10 is a block diagram of a graphics processor, according to an embodiment.

FIG. 10 is a block diagram of a graphics processor 1000, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 1000 includes a memory interface 1014 to access memory. Memory interface 1014 can be an interface to local memory, one or more internal caches, one or more shared external caches, and/or to system memory.

In some embodiments, graphics processor 1000 also includes a display controller 1002 to drive display output data to a display device 1020. Display controller 1002 includes hardware for one or more overlay planes for the display and composition of multiple layers of video or user interface elements. In some embodiments, graphics processor 1000 includes a video codec engine 1006 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 321M/VC-1, and Joint Photographic Experts Group (JPEG) formats such as JPEG, and Motion JPEG (MJPEG) formats.

In some embodiments, graphics processor 1000 includes a block image transfer (BLIT) engine 1004 to perform two-dimensional (2D) rasterizer operations including, for example, bit-boundary block transfers. However, in one embodiment, 3D graphics operations are performed using one or more components of graphics processing engine (GPE) 1010. In some embodiments, graphics processing engine 1010 is a compute engine for performing graphics operations, including three-dimensional (3D) graphics operations and media operations.

In some embodiments, GPE 1010 includes a 3D pipeline 1012 for performing 3D operations, such as rendering three-dimensional images and scenes using processing functions that act upon 3D primitive shapes (e.g., rectangle, triangle, etc.). The 3D pipeline 1012 includes programmable and fixed function elements that perform various tasks within the element and/or spawn execution threads to a 3D/Media sub-system 1015. While 3D pipeline 1012 can be used to perform media operations, an embodiment of GPE 1010 also includes a media pipeline 1016 that is specifically used to perform media operations, such as video post-processing and image enhancement.

In some embodiments, media pipeline 1016 includes fixed function or programmable logic units to perform one or more specialized media operations, such as video decode acceleration, video de-interlacing, and video encode acceleration in place of, or on behalf of video codec engine 1006. In some embodiments, media pipeline 1016 additionally includes a thread spawning unit to spawn threads for execution on 3D/Media sub-system 1015. The spawned threads perform computations for the media operations on one or more graphics execution units included in 3D/Media subsystem 1015.

In some embodiments, 3D/Media subsystem 1015 includes logic for executing threads spawned by 3D pipeline 1012 and media pipeline 1016. In one embodiment, the pipelines send thread execution requests to 3D/Media subsystem 1015, which includes thread dispatch logic for arbitrating and dispatching the various requests to available thread execution resources. The execution resources include an array of graphics execution units to process the 3D and media threads. In some embodiments, 3D/Media subsystem 1015 includes one or more internal caches for thread instructions and data. In some embodiments, the subsystem also includes shared memory, including registers and addressable memory, to share data between threads and to store output data.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

The following examples pertain to further embodiments. Example 1 includes an apparatus comprising: a memory to store an Inter-Domain Permissions Table (IDPT) having a plurality of entries, wherein at least one entry of the IDPT is to provide a relationship between a target address space identifier and a plurality of requester address space identifiers; and a hardware accelerator device to allow access to a target address space, corresponding to the target address space identifier, by one or more requesters, corresponding to the plurality of requester address space identifiers, respectively, based at least in part on the relationship provided by the at least one entry of the IDPT. Example 2 includes the apparatus of example 1, wherein the target address space identifier and the plurality of requester address space identifiers is one of: a node identifier, machine identifier, network identifier, virtual-machine identifier, or a Process Address Space Identifier (PASID). Example 3 includes the apparatus of example 1, wherein the at least one entry of the IDPT is to store an identifier bitmap address. Example 4 includes the apparatus of example 3, wherein the identifier bitmap address is to point to an access control bitmap, wherein each bit in the access control bitmap is to indicate whether a submitter corresponding to that bit is allowed to use a corresponding IDPT entry. Example 5 includes the apparatus of example 1, wherein the at least one entry of the IDPT is to store one or more of: an identifier bitmap address, a window size, a window base, the target address space identifier, one or more of the plurality of requester address space identifiers, a type identifier, a valid status identifier, one or more control fields, and one or more access permissions. Example 6 includes the apparatus of example 1, wherein, in a virtualized environment, for a guest operating system (OS) to utilize one or more capabilities of the IDPT, a virtual memory range bitmap is to be accessed by a hypervisor to restrict a set of access identifiers that the guest OS is allowed to access. Example 7 includes the apparatus of example 6, wherein system software is to manage one of allocation and configuration of the virtual memory range bitmap, wherein the system software is to utilize a sparse memory mapping to support physical memory mapping for actively used portions of the virtual memory range bitmap. Example 8 includes the apparatus of example 6, wherein the system software comprises an operating system. Example 9 includes the apparatus of example 6, wherein the virtual memory range bitmap is to be mapped through Input/Output Memory Management Unit (IOMMU) page tables. Example 10 includes the apparatus of example 1, wherein a processor, having one or more processor cores, comprises the hardware accelerator device and/or the memory.

Example 11 includes one or more non-transitory computer-readable media comprising one or more instructions that when executed on a processor configure the processor to perform one or more operations to cause: a memory to store an Inter-Domain Permissions Table (IDPT) having a plurality of entries, wherein at least one entry of the IDPT is to provide a relationship between a target address space identifier and a plurality of requester address space identifiers; and a hardware accelerator device to allow access to a target address space, corresponding to the target address space identifier, by one or more requesters, corresponding to the plurality of requester address space identifiers, respectively, based at least in part on the relationship provided by the at least one entry of the IDPT. Example 12 includes the one or more computer-readable media of example 11, wherein each of the target address space identifier or the plurality of requester address space identifiers is one of: a node identifier, machine identifier, network identifier, virtual-machine identifier, or a Process Address Space Identifier (PASID). Example 13 includes the one or more computer-readable media of example 11, further comprising one or more instructions that when executed on the one processor configure the processor to perform one or more operations to cause the at least one entry of the IDPT to store an identifier bitmap address. Example 14 includes the one or more computer-readable media of example 11, further comprising one or more instructions that when executed on the one processor configure the processor to perform one or more operations, in a virtualized environment, for a guest operating system (OS) to utilize one or more capabilities of the IDPT, to cause a virtual memory range bitmap to be accessed by a hypervisor to restrict a set of access identifiers that the guest OS is allowed to access. Example 15 includes the one or more computer-readable media of example 14, further comprising one or more instructions that when executed on the one processor configure the processor to perform one or more operations to cause system software to manage one of allocation and configuration of the virtual memory range bitmap, wherein the system software is to utilize a sparse memory mapping to support physical memory mapping for actively used portions of the virtual memory range bitmap.

Example 16 includes a method comprising: storing in a memory an Inter-Domain Permissions Table (IDPT) having a plurality of entries, wherein at least one entry of the IDPT provides a relationship between a target address space identifier and a plurality of requester address space identifiers; and allowing access, at a hardware accelerator device, to a target address space, corresponding to the target address space identifier, by one or more requesters, corresponding to the plurality of requester address space identifiers, respectively, based at least in part on the relationship provided by the at least one entry of the IDPT. Example 17 includes the method of example 16, wherein each of the target address space identifier or the plurality of requester address space identifiers is one of: a node identifier, machine identifier, network identifier, virtual-machine identifier, or a Process Address Space Identifier (PASID). Example 18 includes the method of example 16, further comprising the at least one entry of the IDPT storing an identifier bitmap address. Example 19 includes the method of example 16, further comprising, in a virtualized environment for a guest operating system (OS) to utilize one or more capabilities of the IDPT, a virtual memory range bitmap is to be accessed by a hypervisor to restrict a set of access identifiers that the guest OS is allowed to access. Example 20 includes the method of example 16, further comprising the at least one entry of the IDPT storing one or more of: an identifier bitmap address, a window size, a window base, the target address space identifier, one or more of the plurality of requester address space identifiers, a type identifier, a valid status identifier, one or more control fields, and one or more access permissions.

Example 21 includes an apparatus comprising means to perform a method as set forth in any preceding example. Example 22 includes machine-readable storage including machine-readable instructions, when executed, to implement a method or realize an apparatus as set forth in any preceding example.

In various embodiments, one or more operations discussed with reference to FIG. 1 et seq. may be performed by one or more components (interchangeably referred to herein as "logic") discussed with reference to any of the figures.

In various embodiments, the operations discussed herein, e.g., with reference to FIG. 1 et seq., may be implemented as hardware (e.g., logic circuitry), software, firmware, or combinations thereof, which may be provided as a computer program product, e.g., including one or more tangible (e.g., non-transitory) machine-readable or computer-readable media having stored thereon instructions (or software procedures) used to program a computer to perform a process discussed herein. The machine-readable medium may include a storage device such as those discussed with respect to the figures.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
    a memory to store an Inter-Domain Permissions Table (IDPT) having a plurality of entries, wherein a single entry of the IDPT is to provide a relationship between an access address space identifier and a plurality of submitter address space identifiers; and
    a hardware accelerator device to allow access to an access address space, corresponding to the access address space identifier, by one or more submitters, corresponding to the plurality of submitter address space identifiers, respectively, based at least in part on the relationship provided by the single entry of the IDPT, wherein allowing the access comprises finding the single entry within the IDPT, the single entry being capable of identifying the plurality of submitter address space identifiers including submitter address space identifiers that correspond to the one or more submitters.

2. The apparatus of claim 1, wherein each of the access address space identifiers and the plurality of submitter address space identifiers is one of: a node identifier, machine identifier, network identifier, virtual-machine identifier, or a Process Address Space Identifier (PASID).

3. The apparatus of claim 1, wherein the single entry of the IDPT is to store an identifier bitmap address.

4. The apparatus of claim 3, wherein the identifier bitmap address is to point to an access control bitmap, wherein each bit in the access control bitmap is to indicate whether a submitter corresponding to that bit is allowed to use a corresponding IDPT entry.

5. The apparatus of claim 1, wherein the single entry of the IDPT is to store one or more of: an identifier bitmap address, a window size, a window base, the access address space identifier, one or more of the plurality of submitter address space identifiers, a type identifier, a valid status identifier, one or more control fields, and one or more access permissions.

6. The apparatus of claim 1, wherein, in a virtualized environment, for a guest operating system (OS) to utilize one or more capabilities of the IDPT, a virtual memory range bitmap is to be accessed by a hypervisor to restrict a set of access identifiers that the guest OS is allowed to access.

7. The apparatus of claim 6, wherein system software is to manage one of allocation and configuration of the virtual memory range bitmap, wherein the system software is to utilize a sparse memory mapping to support physical memory mapping for actively used portions of the virtual memory range bitmap.

8. The apparatus of claim 7, wherein the system software comprises an operating system.

9. The apparatus of claim 6, wherein the virtual memory range bitmap is to be mapped through Input/Output Memory Management Unit (IOMMU) page tables.

10. The apparatus of claim 1, wherein a processor, having one or more processor cores, comprises the hardware accelerator device and/or the memory.

11. One or more non-transitory computer-readable media comprising one or more instructions that when executed on a processor configure the processor to perform one or more operations to cause:
a memory to store an Inter-Domain Permissions Table (IDPT) having a plurality of entries, wherein a single entry of the IDPT is to provide a relationship between an access address space identifier and a plurality of submitter address space identifiers; and
a hardware accelerator device to allow access to an access address space, corresponding to the access address space identifier, by one or more submitters, corresponding to the plurality of submitter address space identifiers, respectively, based at least in part on the relationship provided by the single entry of the IDPT, wherein allowing the access comprises finding the single entry within the IDPT, the single entry being capable of identifying the plurality of submitter address space identifiers including submitter address space identifiers that correspond to the one or more submitters.

12. The one or more non-transitory computer-readable media of claim 11, wherein each of the access address space identifiers or the plurality of submitter address space identifiers is one of: a node identifier, machine identifier, network identifier, virtual-machine identifier, or a Process Address Space Identifier (PASID).

13. The one or more non-transitory computer-readable media of claim 11, further comprising one or more instructions that when executed on the one processor configure the processor to perform one or more operations to cause the single entry of the IDPT to store an identifier bitmap address.

14. The one or more non-transitory computer-readable media of claim 11, further comprising one or more instructions that when executed on the one processor configure the processor to perform one or more operations, in a virtualized environment, for a guest operating system (OS) to utilize one or more capabilities of the IDPT, to cause a virtual memory range bitmap to be accessed by a hypervisor to restrict a set of access identifiers that the guest OS is allowed to access.

15. The one or more non-transitory computer-readable media of claim 14, further comprising one or more instructions that when executed on the one processor configure the processor to perform one or more operations to cause system software to manage one of allocation and configuration of the virtual memory range bitmap, wherein the system software is to utilize a sparse memory mapping to support physical memory mapping for actively used portions of the virtual memory range bitmap.

16. A method comprising:
storing in a memory an Inter-Domain Permissions Table (IDPT) having a plurality of entries, wherein a single entry of the IDPT provides a relationship between an access address space identifier and a plurality of submitter address space identifiers; and
allowing access, at a hardware accelerator device, to an access address space, corresponding to the access address space identifier, by one or more submitters, corresponding to the plurality of submitter address space identifiers, respectively, based at least in part on the relationship provided by the single entry of the IDPT, wherein allowing the access comprises finding the single entry within the IDPT, the single entry being capable of identifying the plurality of submitter address space identifiers including submitter address space identifiers that correspond to the one or more submitters.

17. The method of claim 16, wherein each of the access address space identifiers or the plurality of submitter address space identifiers is one of: a node identifier, machine identifier, network identifier, virtual-machine identifier, or a Process Address Space Identifier (PASID).

18. The method of claim 16, further comprising the single entry of the IDPT storing an identifier bitmap address.

19. The method of claim 16, further comprising, in a virtualized environment for a guest operating system (OS) to utilize one or more capabilities of the IDPT, a virtual memory range bitmap is to be accessed by a hypervisor to restrict a set of access identifiers that the guest OS is allowed to access.

20. The method of claim 16, further comprising the single entry of the IDPT storing one or more of: an identifier bitmap address, a window size, a window base, the access address space identifier, one or more of the plurality of submitter address space identifiers, a type identifier, a valid status identifier, one or more control fields, and one or more access permissions.

* * * * *